C. HERTLE.
TOOL MAKER'S SQUARE.
APPLICATION FILED MAR. 7, 1918.
1,286,312.
Patented Dec. 3, 1918.
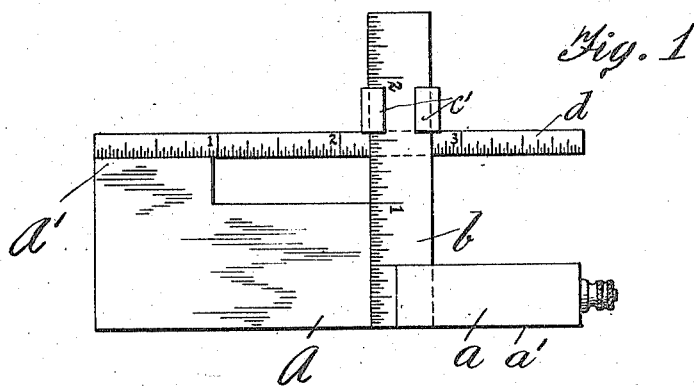
Fig. 1
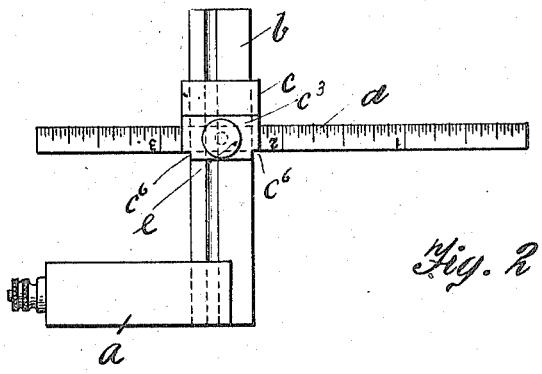
Fig. 2
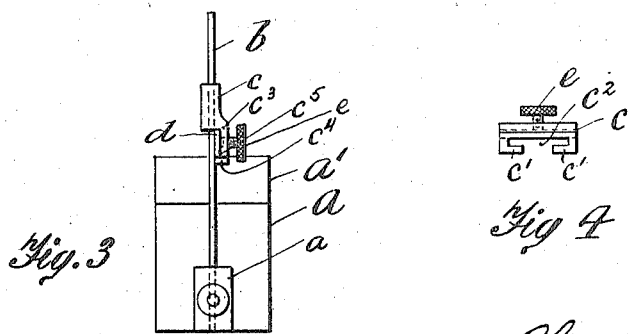
Fig. 3
Fig. 4
Charles Hertle
By his Attorney

UNITED STATES PATENT OFFICE.

CHARLES HERTLE, OF ASTORIA, NEW YORK.

TOOL-MAKER'S SQUARE.

1,286,312.

Specification of Letters Patent.   Patented Dec. 3, 1918.

Application filed March 7, 1918.   Serial No. 220,894.

*To all whom it may concern:*

Be it known that I, CHARLES HERTLE, a subject of the Emperor of Austria-Hungary, residing at Astoria, in the county of Queens and State of New York, have invented certain new and useful Improvements in Tool-Makers' Squares, of which the following is a specification.

The present invention relates to tool makers' squares designed for fine work and has for its object to provide an improved construction whereby the simultaneous squaring or measuring of both the width and height or depth particularly on parts unaccessible to ordinary squares will be rendered possible.

With this and other objects in view, my invention consists in the construction, combination and arrangement of parts as will be hereinafter more fully described and set forth in the appended claims.

The invention is illustrated in the accompanying drawing in which similar reference characters denote corresponding parts and in which Figure 1 is an elevation of my improved square showing one of the uses to which it can be applied; Fig. 2 is a reverse view of the device proper; Fig. 3 is an end view thereof and Fig. 4 is a detail view of the clamp member for clamping the two rules of the device.

The square consists of a block $a$ having a level surface $a'$ and in which in well known manner is adjustably secured a flat and graduated rule $b$. A member $c$ provided on one side with angular flanges $c'$ to form a groove $c^2$ is mounted on said rule $b$, the latter being adapted to slidably engage said rule. This member is formed on its opposite side with a downwardly directed offset extension $c^3$, which at its lower end has an inwardly directed flange $c^4$ and which between its inner surface and that of the rule $b$ forms a free space $c^5$ serving as a socket for a slidable also graduated rule $d$. This rule $d$ extends at a right angle to the rule $b$. Working in the extension $c^2$ is a set screw $e$ which is adapted to project into the free space $c^5$ in order to clamp simultaneously the slide $c$ to the rule $b$ and the rule $d$ within the socket.

The flange $c^4$ is cut away at its ends as at $c^6$ so as to form corners, the edges of which are flush with those of the two rules and which will enable the square being brought close to the object to be squared or measured.

One of the uses to which my improved square can be applied is the following:

Assuming that it is desired to square or measure the height and length of a block A of the form shown in Fig. 1. The square is first adjusted so that the lower edge of the rule $b$ is flush with the level surface $a'$ of the block A so as to rest evenly on the level surface on which the block is supposed to rest when the squaring or measuring thereof is required. Then the square is moved up to one end of the block A so that the graduated edge of the rule $b$ will contact with said block. Thereupon the member $c$, after slackening the set screw $e$, is moved vertically and the rule $d$ horizontally until the rule $d$ rests on the top surface of the block A or as in the present example on the top surface of the upper projection A' of the block and until one of the ends of the rule $d$ or the zero mark thereon coincides with the edge or surface of the block opposite to that against which the rule $b$ rests. The set screw is then tightened whereby the slide and rule $d$ are both clamped in position. Now it will be seen both height and length or width of the block A or the extension A' or both can be read off simultaneously on the scales of the two rules.

Of course there are a number of other uses to which my improved square can be very advantageously applied.

What I claim and desire to secure by Letters Patent is:

1. In combination with a tool maker's square having a rule, of a member slidably engaging said rule and formed with an extension having a flange at its lower end and between the inner surface of which and that of said rule a socket is formed, a second graduated rule slidably engaging said socket and extending at a right angle to said first rule and a single means for simultaneously clamping both said member to said first rule and said second rule within said socket.

2. In combination with a tool maker's square having a rule, of a member slidably engaging said rule and formed with a downwardly directed offset extension having a flange at its lower end, and between the inner surface of which and that of said rule a socket is formed, a second graduated rule slidably engaging said socket and extending at a right angle to said first rule, and a screw working in said extension and serving as a common clamping means for said slidable member and said second named rule.

In testimony whereof I affix my signature in presence of two witnesses.

CHARLES HERTLE.

Witnesses:
FRED. J. GRIESMER,
ELSIE SCHMID.

Copies of this patent may be obtained for five cents each, by addressing the "Commissioner of Patents, Washington, D. C."